United States Patent
Hunzinger et al.

(10) Patent No.: US 10,851,009 B2
(45) Date of Patent: Dec. 1, 2020

(54) METHOD FOR PRODUCING A CERAMIZABLE GREEN GLASS COMPONENT, AND CERAMIZABLE GREEN GLASS COMPONENT, AND GLASS CERAMIC ARTICLE

(71) Applicant: SCHOTT AG, Mainz (DE)

(72) Inventors: Bernhard Hunzinger, Wackernheim (DE); Doris Moseler, Budenheim (DE); Frank Büllesfeld, Kriftel (DE); Ulrich Lange, Mainz (DE)

(73) Assignee: SCHOTT AG, Mainz (DE)

( * ) Notice: Subject to any disclaimer, the term of this patent is extended or adjusted under 35 U.S.C. 154(b) by 893 days.

(21) Appl. No.: 14/926,570

(22) Filed: Oct. 29, 2015

(65) Prior Publication Data
US 2016/0122226 A1 May 5, 2016

(30) Foreign Application Priority Data
Oct. 29, 2014 (DE) .......................... 10 2014 115 754

(51) Int. Cl.
| C03B 23/03 | (2006.01) |
| C03B 23/037 | (2006.01) |
| C03C 3/062 | (2006.01) |
| C03C 10/00 | (2006.01) |
| C03B 32/02 | (2006.01) |

(52) U.S. Cl.
CPC ............ *C03B 23/037* (2013.01); *C03B 32/02* (2013.01); *C03C 3/062* (2013.01); *C03C 10/00* (2013.01); *C03C 10/0036* (2013.01)

(58) Field of Classification Search
CPC .... C03B 32/02; C03B 23/037; C03C 10/0036
See application file for complete search history.

(56) References Cited

U.S. PATENT DOCUMENTS

| 3,597,305 A * | 8/1971 | giffen ...................... C03B 17/02 428/216 |
| 3,635,687 A | 1/1972 | Dunlap et al. |
| 7,231,786 B2 | 6/2007 | Cimo et al. |
| 8,141,387 B2 * | 3/2012 | Letz ......................... C03B 32/02 65/33.2 |
| 2004/0197575 A1 * | 10/2004 | Bocko ..................... C03B 19/12 428/432 |
| 2009/0266808 A1 * | 10/2009 | Shibata ................... C23C 16/46 219/444.1 |

(Continued)

FOREIGN PATENT DOCUMENTS

| EP | 0853071 A1 | 7/1998 |
| JP | 2011093739 A | 5/2011 |

*Primary Examiner* — John M Hoffmann
(74) *Attorney, Agent, or Firm* — Ohlandt, Greeley, Ruggiero & Perle, L.L.P.

(57) ABSTRACT

A method for producing ceramizable green glass components provided, as well as apparatus for performing such method and ceramizable green glass components producible by such method. The method is a redrawing process in which a preform is heated, in a deformation zone, to a temperature that enables redrawing of the glass. The deformation zone is particularly small, which permits redrawing of the ceramizable green glass bodies while avoiding ceramization during the redrawing. The method provides plate-like or sheet-like green glass components that have a particularly smooth surface.

22 Claims, 6 Drawing Sheets

(56) References Cited

U.S. PATENT DOCUMENTS

| | | | |
|---|---|---|---|
| 2010/0281921 A1* | 11/2010 | Bisson | C03B 17/06 65/101 |
| 2011/0314870 A1 | 12/2011 | Fredholm | |
| 2012/0135848 A1 | 5/2012 | Beall et al. | |
| 2012/0304695 A1 | 12/2012 | Lakota et al. | |
| 2014/0087194 A1* | 3/2014 | Dejneka | C03C 4/0028 428/410 |
| 2016/0340227 A1 | 11/2016 | Renz | |
| 2016/0340228 A1 | 11/2016 | Schreder | |

* cited by examiner

METHOD FOR PRODUCING A CERAMIZABLE GREEN GLASS COMPONENT, AND CERAMIZABLE GREEN GLASS COMPONENT, AND GLASS CERAMIC ARTICLE

CROSS REFERENCE TO RELATED APPLICATIONS

This application claims benefit under 35 U.S.C. § 119(a) of German Patent Application No. 10 2014 115 754.0 filed Oct. 29, 2014, the entire contents of which are incorporated herein by reference.

BACKGROUND

1. Field of the Invention

The present invention relates to a method for producing a ceramizable green glass component, in particular a sheet- or plate-shaped ceramizable green glass component which is suitable for being ceramized and can further be used for producing flat glass ceramic articles. The invention further relates to a ceramizable glass, a ceramizable green glass component, and a glass ribbon produced therefrom, a glass ceramic article, and the use of such glass ceramic article.

2. Description of Related Art

Glass ceramics are used in a variety of technical applications. As is known, LAS (lithium aluminum silicate) glass ceramic plates are used as a cover for cooktops, because of their low thermal expansion, and plates used for this purpose have a thickness of about 3 to 6 mm. The manufacturing of a glass ceramic plate which is used as a cooktop cover typically involves melting of a glass, rolling of the molten glass into a plate shape, and subsequent ceramization in a separate ceramization furnace. The glass which can be transformed into a glass ceramic by a crystallization process and ceramization is generally referred to as green glass. A green glass usually includes a component such as $TiO_2$, $ZrO_2$, $SnO_2$, or $Ta_2O_5$, which is suited to form crystallization nuclei when the green glass is reheated, and which permits to influence the resulting crystallite structure of the resulting glass ceramic depending on the proportion thereof.

A variety of applications require glass ceramic articles of a significantly lower thickness. For example, sheets having a thickness of less than 500 μm, preferably less than 100 μm are needed as a dielectric in capacitors. Often, a high surface quality with low roughness is needed in this case, and the surface should furthermore be free of foreign material impurities.

However, thin glass ceramic sheets of a thickness of less than 1 mm cannot be produced using a conventional rolling process. Rolling of thin glass ceramics such as described in US 2012/304695 and US 2011/314870, for example, does not produce a fire-polished surface. Moreover, surface contamination with foreign material is caused by the contact of the molten glass with the rollers.

Thin glass ceramic sheets can basically be produced from thicker glass ceramic bodies by cold processing. For example, glass ceramics may be cut into thin slices using wire saws, and subsequently the layer thickness and surface quality may be precisely adjusted by grinding and polishing processes. Such cold processing is very cost and time consuming. Moreover, layer thicknesses that can be achieved are limited to not less than 200 μm, because thinner slices would break during the cold post processing. Surface contamination due to the grinding and polishing process and leaching or modifications of the surface may also be caused.

Manufacturing of thin glass ceramic sheets by producing green glass sheets from a molten glass using conventional thin glass drawing processes such as floating, downdrawing, overflow fusion downdrawing and subsequent crystallization is extremely problematic and usually ruled out. Some green glasses specifically adapted to the float process may certainly be produced in a float process. However, most glass ceramics exhibit a tendency to crystallize that is too strong, so that they will crystallize during the float process when the glass has input side temperatures of 1000° C. or more. Moreover, sheets may only be produced in a thickness of at least 0.5 mm.

US 2012/135848 proposes to produce a thin glass ceramic by producing a glass sheet using an overflow fusion process, subsequently incorporating $Li_2O$ into the glass sheet by diffusion, and then ceramizing. By adding the essential glass ceramic component $Li_2O$ later, it is intended to enable application of a conventional drawing process. However, the subsequent addition of $Li_2O$ through a diffusion process is very complex and expensive, and furthermore the resulting glass ceramic component is likely to be inhomogeneous.

EP 0 853 071 proposes to provide a glass ceramic using a redrawing process in which an already ceramized glass ceramic preform having a residual glass phase is drawn and does not further crystallize during the redrawing. In this case, the softening temperature of the green glass should remain below the crystallization temperature of the green glass at which further crystallization and consequently diminution of the residual glass phase has to be expected. This method is likewise limited to glass ceramics specifically optimized for this process and is not generally applicable, because during conventional redrawing processes crystallization of the green glass would be caused, resulting in breakages, thickenings, and an overall unstable process.

Furthermore, in a redrawing process for flat preforms with a width-to-thickness ratio, the width-to-thickness ratio generally tends to decrease during redrawing. U.S. Pat. No. 7,231,786 describes how flat glass sheets can be prepared by redrawing. To obtain a product of greater width, grippers are used to draw and stretch the soft glass in the width direction, before edge rollers stretch the glass longitudinally.

U.S. Pat. No. 3,635,687 discloses a redrawing process in which a change in the width-to-thickness ratio is achieved by cooling the edge region of the flat preform. The measures described in these references only cause a small modification in the geometry of the preform compared to the green glass component or the shape of the drawn component. Furthermore, these methods are rather complex and expensive. In particular when gripper or rollers are to be used, a complex redrawing apparatus is required which is prone to defects.

SUMMARY

Therefore, the object of the present invention is to provide an efficient method for producing a ceramizable green glass component, in particular a sheet- or plate-shaped ceramizable green glass component which can be used for producing flat glass ceramic articles.

The ceramizable green glass component should preferably have a small thickness and high homogeneity and high surface quality, preferably fire-polished quality.

Furthermore, a flat glass ceramic article should be provided which is distinguished by a small thickness, high homogeneity, and high surface quality.

This object is achieved surprisingly simply by a method for producing a ceramizable green glass component, by a ceramizable green glass component, and by a glass ceramic article produced therefrom.

Accordingly, the invention relates to a method for producing a ceramizable green glass component, comprising the steps of: preparing a glass melt of ceramizable glass; producing a ceramizable green glass body as a preform for redrawing; providing the preform in a redrawing apparatus; heating at least a portion of the preform; redrawing the preform into a ceramizable green glass component; wherein the ceramizable green glass component has a crystalline content of less than 20 vol %, preferably less than 10 vol %, and more preferably less than 5 vol %.

Redrawing of ceramizable green glass using known methods is usually not applicable, since often crystallization of the green glass is caused during redrawing when using the conventional redrawing processes. The reason for this is the high temperature that is required during redrawing, which is typically in a range about or even above the nucleation temperature of the ceramizable green glass, and which may thus cause nucleation and/or initialized ceramization of the green glass. This in turn results in cracking of the green glass body or breakage. Furthermore, unwanted bulges may be caused.

However, the inventors have now found that even ceramizable green glass can be subjected to a redrawing process under certain very specific conditions. What is crucial in this case is that redrawing only occurs in a very short deformation zone and/or that a very short throughput time of the redrawing process is guaranteed, in particular in the high temperature range.

In this way, ceramizable green glass bodies can be redrawn surprisingly simply, so that thin or thin-walled ceramizable green glass components with outstanding surface quality can be produced very cost-efficiently, most preferably with an at least partially fire-polished surface quality. The inventive method can be applied to known ceramizable green glasses as well.

Typically, for producing a glass melt according to the invention, a mixture of a composition suitable for being ceramized at a later time is supplied to a glass smelter and melted. Various conventional methods can be used to produce glass bodies therefrom, and this glass is also referred to as so-called green glass. Thus, green glass refers to a glass which is directly derived from the glass melt. If the green glass is ceramizable, ceramizable green glass in the context of the invention means that this green glass is suited to be ceramized in a ceramization process and to be converted into a glass ceramic, and also that such ceramization process has just not been performed yet.

Accordingly, a ceramizable green glass is a glass which can optionally be ceramized to be converted into a glass ceramic, but in which this ceramization has not yet occurred to any significant degree. Thus, for the purposes of the invention a ceramizable green glass body is a glass article which can be converted into a glass ceramic article by a subsequent ceramization process.

The term ceramization or ceramizing in the sense of the invention refers to the generation of an article made of glass ceramic or of a glass ceramic article, which is usually accomplished by a heat treatment of a suitable starting glass, i.e. the green glass.

In order to promote this process, nucleating agents such as $TiO_2$, $ZrO_2$, $SnO_2$, or $Ta_2O_5$ are often added to the glass, which allow for a formation of a sufficient number of seed crystals. Other green glasses exhibit phase separation when heated, which in turn serves for nucleation. During the heat treatment or ceramization, this process may be promoted by a two-step temperature process in which the green glass is first heated to a nucleation temperature, to be subsequently crystallized at a higher temperature which promotes crystal growth. This temperature is also referred to as crystal growth temperature. Moreover, glass ceramic systems are known in which nucleation occurs so rapidly that a special nucleation step is not necessary.

Accordingly, a ceramizable green glass body according to the invention comprises a glass suitable for ceramization and may have different shapes. For example, plate- or sheet-like ceramizable green glass bodies may be produced from the not yet solidified molten glass by a rolling process. Rod-shaped ceramizable green glass bodies may be produced as well.

A ceramizable green glass body appropriate for redrawing will also be referred to as a preform below. After having been redrawn, the ceramizable green glass body created thereby, i.e. reshaped from the preform, is referred to as a ceramizable green glass component. The redrawing may cause an alteration in the width-to-thickness ratio of the green glass component as compared to the preform. After having been ceramized subsequently to the redrawing, a glass ceramic article may then be produced from the green glass component.

According to the invention, the green glass component, i.e. the green glass reshaped by the redrawing process, is likewise a ceramizable green glass. That means, the redrawing is preferably performed without initiating a ceramization process.

Therefore, like the preform, the green glass component of the ceramizable green glass body includes only a small crystalline content which is less than 20 vol %, preferably less than 10 vol %, and more preferably less than 5 vol %. In a particularly preferred embodiment, the green glass component of the ceramizable green glass body has a crystalline content of less than 4 vol %, preferably less than 3 vol %, and more preferably less than 2.5 vol %. This allows to subject the ceramizable green glass component to a subsequent ceramization process without problems.

Redrawing of glasses is known in principle. In a redrawing process, a piece of glass is partially heated and drawn longitudinally using appropriate mechanical equipment. If the preform is advanced into a heating zone at a constant velocity and the heated glass is drawn at a constant velocity the result will be a reduction of the cross-sectional shape of the preform that depends on the ratio of the velocities.

Thus, if for example rod-shaped or tubular preforms are used, the resulting green glass components will again be rod-shaped or tubular, but will have a smaller diameter. Similarly, sheet-shaped preforms can be redrawn. The green glass components may have a similar cross-sectional shape as the preform, so as to represent a true, scaled-down image of the preform in terms of their cross-sectional shape. However, the preform may as well be reshaped so that in the case of plate-shaped preforms a strip-shaped green glass component of reduced thickness is resulting.

When redrawing glasses, typically an elongated preform is clamped in a holder at one end and is heated at the other end, for example in a muffle furnace. Once the glass becomes deformable, it is extended by applying a tension force at the end of the preform clamped in the holder. If, in this case, the preform is further fed into the muffle, with an appropriately chosen temperature, a green glass component of similar geometry but with a smaller cross-sectional area will be obtained.

Similarly, an approximately strip-shaped green glass component may be produced by redrawing from a sheet-like preform, which green glass component will have a significantly smaller thickness than the preform.

The choice of the velocities for drawing the green glass component and for feeding the preform determine the deformation or reduction ratio of the cross section.

For the purposes of the invention, a preform, in particular a plate- or sheet-like preform of a ceramizable green glass body may be provided with a mean thickness D and a mean width B. At least a portion thereof is then heated, in particular the deformation zone of the preform. Subsequently, the preform is drawn to adopt a mean thickness d and a mean width b, thereby determining the cross-sectional shape of the green glass component. Thus, an alteration in the cross-sectional geometry of the preform transversely to the drawing direction may be achieved by the redrawing.

The deformation zone refers to the portion of the preform in which the preform has a thickness between 0.95*D and 1.05*d, and the deformation zone has a height of not more than 50*D, preferably not more than 10*D, more preferably not more than 6*D (in particular at most 100 mm), most preferably not more than 5*D (in particular at most 40 mm), and particularly preferably not more than 4*D (in particular at most 30 mm).

The method of the invention for redrawing ceramizable green glass bodies is distinguished by the fact that the deformation zone is very small compared with the prior art. Surprisingly, it is thus possible to subject to a redrawing process even a green glass suitable for ceramization, without already initiating an undesired and/or uncontrolled ceramization thereby.

In this case, the deformation zone (=the meniscus) has a height of not more than 50*D, preferably not more than 10*D, more preferably not more than 6*D (in particular at most 100 mm), most preferably not more than 5*D (in particular at most 40 mm), and particularly preferably not more than 4*D (in particular at most 30 mm).

The deformation zone preferably extends over the entire width of the preform. The "height" of the deformation zone refers to the dimension thereof in the direction in which the preform is drawn. The deformation zone is the region in which the preform has a thickness between 0.95*D and 1.05*d. It is therefore a region in which the glass deforms. The thickness is smaller than the original thickness D, but the final thickness d has not yet been achieved. The temperature in the deformation zone may, for example, be a temperature T2 at which the glass of the preform has a viscosity $\eta 2$ between $\eta 2=10^4$ dPa·s and $\eta 2=10^8$ dPa·s.

The width b of the redrawn green glass component progressively decreases as the viscosity in the deformation zone increases. For example, if in the case of softening the drawing velocity is increased in order to obtain a thickness d of the green glass component of 100 μm, the width b of the green glass component would be significantly reduced as compared to the width B of the preform. In order to obtain a flat green glass component with a high ratio of b/d, it is therefore advantageous if the glass of the preform in the deformation zone has a viscosity $\eta 2$ that is lower than the viscosity of the respective glass at the softening point (SP). Preferably, therefore, the glass of the preform in the deformation zone has a viscosity $\eta 2$ of not more than $\eta 2=10^{7.6}$ dPa·s, more preferably not more than $\eta 2=10^{7.5}$ dPa·s, even more preferably not more than $\eta 2=10^{7.0}$ dPa·s, most preferably not more than $\eta 2=10^{6.5}$ dPa·s.

Furthermore, a viscosity $\eta 2$ which is less than the viscosity of the respective glass at the softening point is also advantageous because the drawing force required for extending the green glass progressively increases with increasing viscosity. Thus, a lower viscosity therefore implies that a lower drawing force is required.

However, the viscosity $\eta 2$ of the ceramizable green glass of the preform in the deformation zone should not be too low on the other hand, since otherwise uniform extension of the glass is made difficult. The glass of the preform in the deformation zone preferably has a viscosity $\eta 2$ of at least $\eta 2=10^{4.0}$ dPa·s, more preferably at least $\eta 2=10^{4.5}$ dPa·s, still more preferably at least $\eta 2=10^{5.0}$ dPa·s, most preferably at least $\eta 2=10^{5.8}$ dPa·s.

The redrawing according to the present invention may be combined with an additionally cooling of the edge regions of the preform similar to U.S. Pat. No. 3,635,687 which is hereby fully incorporated by reference, in order to achieve an even greater width and/or a better thickness distribution. A higher temperature at the edge is also possible, in order to achieve a better thickness distribution.

The deformation zone is the portion of the preform that has a thickness between 0.95*D and 1.05*d. Preferably this is the portion of the preform which is at the temperature T2 at a specific time during the process. At this temperature, the viscosity of the glass of the preform is in a range that allows the glass to deform.

Outside the deformation zone, the temperature of the preform is preferably less than T2. Thus, the deformation of the preform substantially exclusively occurs in the region of the deformation zone. Upstream and downstream thereof both the thickness and the width preferably remain constant.

The increase in the width-to-thickness ratio of the preform preferably substantially results from the fact that the thickness d of the green glass component produced is substantially smaller than the thickness D of the preform. The thickness d is preferably not more than D/10, more preferably not more than D/30, and most preferably not more than D/75. The green glass component then has a thickness d of preferably less than 10 mm, more preferably less than 1 mm, even more preferably less than 100 μm, yet more preferably less than 50 μm, and most preferably less than 30 μm. The present invention permits to produce such thin ceramizable green glass components with high quality and comparatively large area.

The width b of the produced green glass component is preferably only slightly reduced as compared to the width B of the preform. This means that the ratio B/b is preferably at most 2, more preferably at most 1.6, and most preferably not more than 1.25.

The method may be performed in a redrawing apparatus which is also within the scope of the invention. For the purpose of heating the preform may be introduced into the redrawing apparatus. The redrawing apparatus preferably includes a holder in which the preform can be clamped at one end. The holder is preferably located in an upper portion of the redrawing apparatus. In this case, an upper end of the preform is clamped in the holder.

The redrawing apparatus comprises at least one heating means. The heating means is preferably arranged in a central region of the redrawing apparatus. The heating means may preferably be an electric resistance heater, a burner assembly, a radiant heater, a laser with or without a laser scanner, or a combination thereof. The heating means is preferably configured so as to be able to heat the preform which is located in a deformation region so that the deformation zone adapted according to the invention adopts the temperature T2. The deformation region is a region which is preferably situated within the redrawing apparatus. The heating means heats the deformation region and/or a portion of the preform to a sufficiently high temperature so that a preform located in the deformation region reaches the temperature T2 in its deformation zone. If a heating means is used which is suitable to selectively heat only a portion of the preform, such as a laser, the deformation region will hardly heat up.

The deformation region preferably has a height that creates a deformation zone of a height H of not more than 50*D, preferably not more than 10*D, more preferably not more than 6*D (in particular at most 100 mm), particularly preferably not more than 5*D (in particular at most 40 mm), and most preferably not more than 4*D (in particular at most 30 mm). Depending on the type of heating and the dimensions of the preform, the deformation region may therefore have various different lengths.

The preform or a portion of the preform intended to be deformed is advantageously first heated to a temperature below the crystallization temperature, that means below a temperature at which crystal formation starts, and below the softening point of the green glass. In this way, crystal formation can be prevented. Within the deformation region the preform is heated to a temperature T2 above the softening point (viscosity of the glass=$10^{7.6}$ dPa·s).

Of great importance for the invention is that the ceramizable green glass is subjected to a temperature above the temperature that is critical for crystallization only for a very short time. For the purposes of the invention, this temperature refers to the temperature at which ceramization and/or crystallization might start. In this manner, a premature and undesired start of ceramization can be prevented in particular during the deformation in the deformation region.

The maximum time span depends on the temperature in the deformation zone and on the respective ceramizable green glass. Generally, time spans in a range of not more than 5 s have proven to be non-critical. Preferably the time span is smaller, advantageously it is therefore less than 4 s, most advantageously less than 3 s. The time span here refers to the period of time during which a given glass volume of the preform intended to be deformed by redrawing is at a temperature above the temperature critical for crystallization.

The dwell time of the preform in the deformation region in this case is less than 10 minutes, preferably less than 5 minutes, more preferably less than 1 minute, and most preferably less than 30 s, in order to reliably prevent undesired ceramization.

The heating means heat the deformation region and/or a portion of the preform which preferably has a dimension just sufficient so that the deformation zone of the preform embodied according to the invention is heated to the temperature T2. The portions of the preform upstream and downstream of the deformation zone are preferably at a temperature less than T2. According to the invention, this is preferably achieved by the fact that the heating means include one or more shields shading those portions of the preform which are outside of the deformation region. Alternatively or additionally, heating means may be used that enable focused heating of the preform in the deformation region, such as a laser or a laser scanner. Another alternative embodiment relates to a heating means which itself only has a small height and is located close to the deformation zone, so that the heat substantially does not penetrate into regions outside the deformation region.

The heating means may comprise a radiant heater whose heating effect is focused or restricted to the deformation region by appropriate beam guides and/or beam stops. For example, short-wave infrared heating may be employed, in which case an appropriately small deformation zone according to the invention is obtained by shading. Cooled shields (cooled by gas, water, or air) may also be used. Another heating means that can be used is a laser. A laser scanner may be used for guiding the beam of the laser.

The device may comprise cooling means which are preferably arranged in a lower portion of the redrawing apparatus, in particular directly below the heating means. Thus, the green glass is brought to viscosities of more than $10^9$ dPa·s preferably immediately after having been reshaped, so that it will not deform any further to any appreciable extent. This cooling is preferably performed in a manner so that a change in viscosity of at least $10^6$ dPa·s/s is achieved. Depending on the green glass of the preform, this corresponds to temperatures T3 in a range from about 400 to 1000° C.

The inventive method preferably comprises further cooling the ceramizable green glass component after emerging from the deformation region. The further cooling of the ceramizable green glass component to viscosities of >$10^9$ dPa·s may be achieved by natural cooling at ambient or room temperature (e.g. 10 to 25° C.). However, the ceramizable green glass component may likewise be actively cooled in a fluid such as a gas stream. Particularly preferably, the ceramizable green glass component is passed through a cooling zone downstream the deformation region to be slowly cooled therein, so that the residual stresses at least allow for subsequent crosscutting and severing of borders without cracking.

Preferably, the deformation region is arranged and/or the heating means are configured so that the deformation zone develops in the preform. By heating the deformation zone of the preform, the viscosity of the glass at the corresponding site is decreased to the extent that the preform can be drawn.

Thereby the preform becomes much longer, while approximately retaining its width. That means, the drawing of the preform causes a considerable reduction of the thickness D. Since the preform is preferably clamped in a holder at its upper end, which holder is preferably located in an upper portion of the redrawing apparatus, the drawing of the preform may already be achieved solely by the action of gravity.

In a preferred embodiment, the redrawing apparatus may comprise drawing means which preferably exert a tension force on a portion of the preform below the deformation region, in particular at the lower end of the preform.

The drawing means are preferably arranged in a lower portion of the redrawing apparatus. The drawing means may be configured to comprise rollers that engage at opposite sides of the preform. The preform may be releasably attached to a second holder at a lower end thereof. The second holder in particular forms part of the drawing means. For example, a weight may be attached to the second holder which will then extend the preform longitudinally.

Preferably, the drawing force applied is less than 350 N per 400 mm width (B) of the preform, more preferably less than 300 N per 400 mm width of the preform, even more preferably less than 100 N per 400 mm width of the preform, most preferably less than 50 N per 400 mm width of the preform. Preferably, the drawing force is greater than 1 N per 400 mm width of the preform, more preferably greater than 5 N per 400 mm width of the preform, even more preferably greater than 10 N per 400 mm width of the preform, most preferably greater than 20 N per 400 mm width of the preform.

In a preferred embodiment, the preform is continuously fed toward the deformation region so that the method can be performed continuously. For this purpose, the redrawing apparatus preferably comprises feeding means which are adapted to advance the preform into the deformation region. Thus, the redrawing apparatus can be employed in continuous operation. The feeding means preferably advance the preform into the deformation region at a velocity $v_1$ which is smaller than the velocity $v_2$ at which the preform is drawn. So, the preform is extended longitudinally. The ratio of $v_1$ to $v_2$ is in particular $v_1/v_2<1$, preferably not more than 0.8, more preferably not more than 0.4, and most preferably not more than 0.1. The difference between these two speeds determines to which extent the width and thickness of the preform is reduced.

The preform is preferably preheated prior to the heating. For this purpose, the redrawing apparatus preferably comprises a preheating zone in which the preform can be heated to a temperature T1. The preheating zone is preferably arranged in an upper portion of the redrawing apparatus. The temperature T1 approximately corresponds to a viscosity $\eta 1$ between $10^{10}$ and $10^{14}$ dPa·s. Thus, the preform is preferably preheated before entering the deformation region. This allows for a faster passage through the deformation region, since less time is required to reach the temperature T2. Moreover, with the preheating zone glasses having a high coefficient of thermal expansion are prevented from shattering due to excessive temperature gradients.

A particular advantage is that due to the preheating the time span is reduced within which the preform is exposed to a temperature above the temperature critical for ceramization or crystallization, and in this way unwanted ceramization is reliably avoided.

In a preferred embodiment, the deformation zone is heated to a temperature T2 corresponding to a viscosity of the green glass of the preform between $10^{5.8}$ and $10^{7.6}$ dPa·s, in particular from $10^{5.8}$ to less than $10^{7.6}$ dPa·s. The viscosity of a ceramizable green glass depends on the temperature. At each temperature the ceramizable green glass exhibits a specific viscosity. The temperature T2 that is needed to obtain the desired viscosity $\eta 2$ in the deformation zone depends on the glass. The viscosity of a glass is determined according to DIN ISO 7884-2, -3, -4, -5.

The subject matter of the invention further comprises a green glass component.

The redrawing method described above permits to produce thin-walled ceramizable green glass components which have a thickness d of less than 2000 µm, less than 1000 µm, less than 500 µm, less than 100 µm, preferably less than 50 µm, more preferably less than 40 µm, less than 30 µm, less than 20 µm, less than 10 µm, with at least one surface of the ceramizable green glass component having a fire-polished surface quality, at least in sections thereof.

A fire-polished surface herein refers to a glass surface resulting from a hot forming process, which has been obtained without any contact of the molten glass to a foreign material such as a press mold or a roller. Fire-polished surfaces are generally distinguished by a very low roughness depth which cannot be achieved with conventional mechanical finishing processes. Furthermore, fire-polished surfaces may have a slightly altered chemical composition compared to the bulk material, due to an evaporation of glass components such as $B_2O_3$ or alkalis. In particular, fire-polished surfaces do not have the grinding or polishing traces which are typical for mechanical cold finishing. Therefore it is possible by appropriate analyses to clearly distinguish a fire-polished glass surface from a mechanically polished glass surface.

The ceramizable green glass component may preferably have a plate-like shape with two faces and a peripheral edge, and at least one face of the ceramizable green glass component has a fire-polished surface quality with $R_a \leq 20$ nm, at least in sections thereof.

The green glass component may have a thickness-to-width ratio d/b of not more than 1:200, preferably of not more than 1:20,000, and more preferably of not more than 1:200.000. The ceramizable green glass components of the invention may have a very high surface quality, which most preferably is of fire-polished quality, at least partially.

The ceramizable green glass component produced according to the invention is furthermore distinguished by the fact that it contains no or no substantial quantity of precipitated crystals. If crystals are present, they are very small. The maximum grain size is therefore smaller than 20 nm, preferably smaller than 10 nm. This ensures that the green glass component may subsequently be subjected to a ceramization process without requiring any special measures for the ceramization.

For the redrawing of ceramizable green glass according to the invention, glasses of different compositions may be used. Most preferably, the green glass comprises one of the following compositions, in mol %:

Composition 1:
  $SiO_2$: 5-20 mol %
  $Al_2O_3$: 4-15 mol %
  $B_2O_3$: 0-5 mol %
  BaO: 20-45 mol %
  $TiO_2$: 20-60 mol %
  CaO: 0-5 mol %
  SrO: 0-10 mol %
  $CeO_2$: 0-5 mol %
  $ZrO_2$: 0-10 mol %
  $La_2O_3$: 0-40 mol %
  $MnO_2$: 0-5 mol %
  $Y_2O_3$: 0-5 mol %
  $Nb_2O_3$: 0-30 mol %
  Others: <10 mol %

Composition 2:
  $Al_2O_3$: 3-12 mol %
  BaO: 30-45 mol %
  $B_2O_3$: 0-5 mol %
  $La_2O_3$: 0-5 mol %
  $CeO_2$: 0-5 mol %
  $SiO_2$: 5-25 mol %
  $TiO_2$: 25-42 mol %
  CaO: 0-5 mol %
  $\Sigma Al_2O_3+B_2O_3+SiO_2+P_2O_5$: 15-30 mol %
  $\Sigma TiO_2+ZrO_2+Nb_2O_3+V_2O_5+HfO_2+Sc_2O_3$: 20-50 mol %
  $\Sigma BaO+CaO+SrO+CeO_2+RE_2O_3$: 30-50 mol %
  Others <5 mol %.

Herein, "others" refers to the sum of all elements and their oxides not mentioned in any of the molecular formulas.

Composition 3:
  $Al_2O_3$: 5-15 mol %
  BaO: 20-30 mol %
  $La_2O_3$: 0-10 mol %
  $CeO_2$: 0-2 mol %
  $SiO_2$: 5-20 mol %
  $TiO_2$: 40-60 mol %
  $ZrO_2$: 5-10 mol %
  Others: <5 mol %
  $\Sigma Al_2O_3+B_2O_3+SiO_2+P_2O_5$: 15-30 mol %
  $\Sigma TiO_2+ZrO_2+Nb_2O_3+V_2O_5+HfO_2+Sc_2O_3$: 30-55 mol %
  $\Sigma BaO+CaO+SrO+CeO_2+RE_2O_3$: 25-40 mol %
  Others: <5 mol %.

Herein, "others" refers to the sum of all elements and their oxides not mentioned in any of the molecular formulas.

RE, in each case, refers to one or more rare earth elements having atomic numbers from 57 to 71, and 39.

Other ceramizable glasses may as well be used for the method of the invention, including lithium aluminum silicate glass ceramics (LAS), lithium silicate glass ceramics, magnesium/zinc aluminosilicate glass ceramics (MAS), magnesium silicate glass ceramics, sodium/potassium aluminosilicate glass ceramics (NaAS, KAS), phosphate glass ceramics (phosphate GC), calcium aluminosilicate glass ceramics, with compositions as follows.

Lithium Aluminum Silicate Glass Ceramics (LAS, in Wt %):
  $Al_2O_3$: 18-25 wt %
  $SiO_2$: 55-72 wt %
  $Li_2O$: 1-5.0 wt %
  $K_2O$: 0-3 wt %
  $Na_2O$: 0-3 wt %
  MgO: 0-3 wt %
  $P_2O_3$: 0-1 wt %
  $SnO_2$: 0-1 wt %
  $TiO_2$: 1.2-3 wt %
  $ZrO_2$: 0.5-3.0 wt %
  ZnO: 0-5 wt %.

Lithium Silicate Glass Ceramics (Li-Disilicate, Metasilicate), (in Wt %):
  $Al_2O_3$: 2-25 wt %
  $SiO_2$: 60-85 wt %
  $Li_2O$: 5-15 wt %
  $K_2O+Na_2O$: 0-8 wt %
  Ag, Au: <0.2 wt %.

Magnesium/Zinc Aluminosilicate Glass Ceramics (MAS): (Spinel, Gahnite, Cordierite, Enstatite)
Spinel/Gahnite (in Wt %):
  $SiO_2$: 15-60 wt %
  $Al_2O_3$: 20-50 wt %
  MgO: 0-40 wt %,
  ZnO: 0-40 wt %,
  MgO+ZnO: 10-50 wt %.
Cordierite (in Wt %):
  $SiO_2$: 35-60 wt %
  $Al_2O_3$: 16.5-40 wt %
  MgO: 6-22 wt %
  $B_2O_3$. 0-10 wt %
  CaO, BaO, SrO: 0-6 wt %
  ZnO: 0-7.5 wt %
  $TiO_2$: 1-15 wt %
  $ZrO_2$: 0-10 wt %
  $As_2O_3+Sb_2O_3$: 0-2 wt %.
Enstatite (in Wt %):
  MgO: 20-35 wt %
  $Al_2O_3$: 2-12 wt %
  $SiO_2$: 40-70 wt %
  $Li_2O$: 0-2 wt %
  CaO: 0-4 wt %
  SrO: 0-12 wt %
  BaO: 0-17 wt %
  $ZrO_2$: 0-15 wt %
  $TiO_2$: 0-15 wt %.
Magnesium Silicate (Forsterite) (in Wt %):
  $SiO_2$: 30-60 wt %
  $Al_2O_3$: 10-25 wt %
  MgO: 13-30 wt %
  $K_2O$: 0-20 wt %
  $Na_2O$: 0-10 wt %
  $TiO_2$: 0-15 wt %
  $GeO_2$: 0-25 wt %.

Sodium/Potassium Aluminosilicate Glass Ceramics (NaAS, KAS) (Nepheline, Kalsilite) (in Wt %):
  $Na_2O+K_2O$: 5-40 wt %
  $Al_2O_3$: 10-40 wt %
  $SiO_2$: 25-75 wt %
  CaO+BaO+MgO: 0-18 wt %
  $TiO_2$: <10 wt %
  $ZrO_2$: <10 wt %;
preferably:
  $Na_2O+K_2O$: 10-30 wt %
  $Al_2O_3$: 10-35 wt %
  $SiO_2$: 30-55 wt %.

Phosphate Glass Ceramics (in Wt %):
(Apatite, LISICON, $BPO_4$)
Apatite (in Wt %):
  CaO: 5-45 wt %
  $Al_2O_3$: 5-38 wt %
  $P_2O_5$: 10-26 wt %
  $SiO_2$: 10-60 wt %
  MgO: 0-26 wt %
  $K_2O$, $Na_2O$, $Li_2O$: 0-10 wt %
  $TiO_2$, $ZrO_2$: 0-10 wt %
LISICON (in wt %):
  $Al_2O_3$: 0-20; preferably 4-18; more preferably 6-15.5
  $GeO_2$: 0-38; preferably <20; more preferably <10
  $Li_2O$: 2-12; preferably 4-8
  $P_2O_5$: 30-55
  $TiO_2$: 0-35
  $ZrO_2$: 0-16
  $SiO_2$: 0-15
  $Cr_2O_3+Fe_2O_3$: 0-15
  $Ga_2O_3$: 0-15
  $Ta_2O_5$: 0-36.5
  $Nb_2O_5$: 0-30
  Halogenides: <5, preferably <3, more preferably <0.3
  $M_2O$: <1; preferably <0.1; with M being an alkali cation, with the exception of Li+.
$BPO_4$ (in Wt %):
  $SiO_2$: 10-50 wt %
  $B_2O_3$: 5-40 wt %
  $P_2O_5$: 25-75 wt %
  refining agents: <5 wt %
  $M3_2O_3$, $M5_2O_5$ and $M4O_2$: <10 wt %.

Calcium Aluminosilicate (in Wt %):
Wollastonite (in Wt %):
  $SiO_2$: 50-65 wt %
  $Al_2O_3$: 0-13 wt %
  CaO: 15-55 wt %
  ZnO: 2-10 wt %
  $K_2O$, $Li_2O$, $Na_2O$: 0-5 wt %
  $P_2O_5$: 0-10 wt %
Anorthite (in Wt %):
  $SiO_2$ 15-54 wt %
  $Al_2O_3$ 13-40 wt %
  CaO 5-22 wt %
  BaO, MgO 0-10 wt %
  $TiO_2$ 0-12 wt %

Further glasses that are suitable for the method for producing a ceramizable green glass component are photosensitive glasses. Such a glass is sensitized, that means it is more sensitive to irradiation with ultraviolet light and can be crystallized more easily and with greater aspect ratios than a non-sensitized glass of the same composition. It will also be referred to as a sensitized photo-patternable glass below.

Although suitable glasses may exhibit a pronounced crystallization tendency so that they can be processed by photo-patterning, they do not need to exhibit an extremely high crystallization tendency on the other hand. This is achieved by process control and/or by the composition of the glasses. For example, the glasses useful for this purpose have a stoichiometry deviating rather strongly from the metasilicate stoichiometry, furthermore they are preferably melted in comparatively oxidizing manner.

An important aspect which is responsible for the pronounced but moderate crystallization tendency of the preform and of the glass articles according to the invention is their composition. To a considerable extent this is based on an appropriate adjustment of the relative molar ratios of the cations (crystal stoichiometry). Therefore, it makes sense to characterize the glass composition by amounts in percent of cations. The term "percent of cations" (abbreviated "% of cations") refers to the relative molar proportions of the cations in the total amount of cations in the glass. Of course, the glass also contains anions whose relative molar proportions in relation to the total amount of anions in the glass are given in "percent of anions" (abbreviated "% of anions") herein.

A preferred photosensitive glass comprises the following components, in % of cations:

| | |
|---|---|
| $Si^{4+}$ | 45 to 65 |
| Crystal agonists | 30 to 45 |
| Crystal antagonists | 3.5 to 9 |

Accordingly, the sensitized photo-patternable glass preferably comprises $Si^{4+}$, one or more crystal agonists, one or more crystal antagonists, and a pair of nucleating agents, wherein:
 the crystal agonists are selected from $Na^+$, $K^+$, and $Li^+$;
 the crystal antagonists are selected from $Al^{3+}$, $B^{3+}$, $Zn^{2+}$, $Sn^{2+}$, and $Sb^{3+}$; and
 the pair of nucleating agents comprises cerium and at least one representative from the group containing silver, gold, and copper.

In a preferred embodiment, the photosensitive glass comprises the following components, in % of cations:

| | |
|---|---|
| $Si^{4+}$ | 45 to 65 |
| Crystal agonists | |
| $Li^+$ | 25 to 40 |
| $K^+$ | 0 to 8 |
| $Na^+$ | 0 to 8 |
| Crystal antagonists | |
| $B^{3+}$ | 0 to 5 |
| $Al^{3+}$ | 0 to 10 |
| $Zn^{2+}$ | 0 to 4 |
| Nucleating agents | |
| $Ce^{3+}/Ce^{4+}$ | >0 to 0.3 |
| $Ag^+$ | >0 to 0.5 |

Besides the cations, the photosensitive glass comprises anions that are preferably selected from the group consisting of $O^{2-}$, $F^-$, $Br^-$, $Cl^-$, and $SO_4^{2-}$. The molar fraction of $O^{2-}$ of the anions should preferably be at least 50% (% of anions), more preferably at least 70%, yet more preferably at least 90%, and most preferably at least 98%. In a preferred embodiment, the photosensitive glass is entirely oxidic, that means it exclusively contains $O^{2-}$ anions and is free of other anions.

The photosensitive glass preferably includes only small amounts of halides. Preferably, the content of halides among the anions is limited to not more than 5% of anions, more preferably to not more than 3% of anions, and most preferably to not more than 1% of anions. In the context of the invention, preferably, halides refer to the anions of Cl, F, and Br. In specific embodiments, the glass does not contain any anions of Cl, F and/or Br, or contains these components in fractions of preferably not more than 3% of anions, 2% of anions, or 1% of anions.

Prior to being irradiated with UV light, the photosensitive glass preferably comprises substantially no colloidal silver. The silver which is preferably present in the photosensitive glass exists in the form of $Ag^+$ prior to the irradiation, in particular a proportion of at least 95%, more preferably at least 99% thereof.

The photosensitive glass should preferably contain not more than 5% of cations of $Ti^{4+}$ (titanium). Titanium affects the transmission of the glass in particular in the UV range, which has a negative effect on the pattern depths that can be achieved. Preferably, the content of titanium is limited to at most 3% of cations, more preferably to at most 1% of cations. Preferred embodiments contain titanium amounts of less than 0.2% of cations or are free of titanium.

The photosensitive glass is preferably free of components not mentioned above, in particular free of cations of La, Nb, W, Hf, Bi, Y, Yb, Pb, As, Ta, Gd, and/or Eu.

The table below shows the compositions of photo-sensitive glasses that can be used, in % of cations. All glasses listed are oxidic glasses, i.e. the amount of anions other than oxygen is not more than 2% of anions.

TABLE

Examples B1 to B5 for photosensitive glasses, in % of cations

| | Components | | | | |
|---|---|---|---|---|---|
| | B1 | B2 | B3 | B4 | B5 |
| $Si^{4+}$ | 59.6 | 52.1 | 60.4 | 53 | 60.1 |
| $K^+$ | 3.8 | 5.6 | 3.4 | 3.78 | 4.08 |
| $Na^+$ | 2.5 | 2.8 | 0.15 | 3.79 | 2.51 |
| $Ag^+$ | 0.06 | 0.06 | 0.004 | 0.044 | 0.043 |
| $B^{3+}$ | 0.26 | 0.94 | 0 | 0 | 0 |
| $Al^{3+}$ | 3.8 | 5.14 | 4.27 | 6.05 | 3.86 |
| $Li^+$ | 29.2 | 32.2 | 31.4 | 33.3 | 28.8 |
| $\Sigma(Ce^{4+}, Ce^{3+})$ | 0.011 | 0.01 | 0.003 | 0.007 | 0.005 |
| $Zn^{2+}$ | 0.56 | 1.07 | 0.27 | 0 | 0.54 |
| $Sb^{3+}$ | 0.17 | 0.12 | 0.07 | 0.118 | 0.13 |
| Sum of components | 99.96 | 100.04 | 99.97 | 100.09 | 100.07 |
| $Li^+/Si^{4+}$ | 0.49 | 0.62 | 0.52 | 0.63 | 0.48 |
| $\Sigma(Li^+, Na^+, K^+)$ | 35.5 | 40.6 | 34.95 | 40.9 | 35.4 |
| $\Sigma(Li^+, Na^+, K^+)/Si^{4+}$ | 0.6 | 0.78 | 0.58 | 0.77 | 0.59 |
| $\Sigma(B^{3+}, Al^{3+}, Zn^{2+})$ | 4.6 | 7.2 | 4.5 | 6.1 | 4.4 |
| $Ag^+/\Sigma(Ce^{4+}, Ce^{3+})$ | 5.45 | 6 | 1.33 | 6.3 | 8.6 |

Such a photosensitive glass is available from SCHOTT, Mainz, under the trade name Foturan® and has the following composition, in wt %:
 Foturan® (in Wt %):
 $SiO_2$ 78.5 wt %
 $B_2O_3$ 0.2 wt %
 $Al_2O_3$ 4.2 wt %
 $Li_2O$ 9.6 wt %
 $Na_2O$ 1.7 wt %
 $K_2O$ 4.0 wt %
 $ZnO$ 1.0 wt %
 $Ag_2O$ 0.16 wt %
 $CeO_2$ 0.04 wt %
 $Sb_2O_3$ 0.5 wt %

The redrawing method of the invention will now be described in more detail with reference to exemplary embodiments.

EXAMPLE 1

BaTiO$_3$ Glass Ceramic

A green glass sheet of a ceramizable glass, preferably BaTiO$_3$, which was produced by a rolling process may be provided as a starting body. From the ceramizable green glass sheet, a green glass body of dimensions 100 mm×50 mm×2 mm may then be produced as a preform for redrawing, by scribing and breaking. This preform is then introduced from above into a resistance heated furnace at a constant feed velocity of 1 mm/s and is preheated to 690° C. The preheating temperature is preferably selected such that it is below the nucleation temperature of the ceramizable green glass. In this way, undesirable premature ceramization of the green glass is prevented from starting.

The preform may be subjected to a force at its lower end, for instance by a weight. Furthermore, the furnace may have an opening through which a laser beam may be guided to be focused on the glass. This may be a CO$_2$ laser, for example, which is operated at a power of 400 W.

Particularly advantageously, the laser beam may pass a scanner mirror before impinging on the preform, for being oscillated across the preform at a velocity of about 200 m/s. In this manner, a zone of about 3 mm may be heated to a temperature above the softening point of the green glass.

In this case, the turning points of the laser beam are outside the preform. Due to the force applied, the heated portion is subjected to a constant tension force, so that the green glass will elongate and become thinner in the heated portion.

It is crucial for the invention that the green glass is exposed to a temperature above the temperature critical for crystallization only during a very short time span. In this manner, a premature and undesired start of ceramization can be prevented.

Time spans that have been found non-critical are in a range of not more than 5 s. Preferably, the time span is shorter, therefore it is advantageously less than 4 s, more advantageously less than 3 s. With such short time spans within which the green glass is subjected to a temperature above the temperature which is critical for crystallization, unintentional initialization of ceramization can be reliably prevented.

In this way it is possible to obtain, from a ceramizable green glass body as a preform having a geometry as mentioned above, a ceramizable green glass component which has a strip-like shape with a thickness d from 0.01 to 0.7 mm and a width b of approximately 45 mm. As a result a region of constant thickness having a width from 20 mm to 35 mm is obtained, with a thickened border region on both sides along the outer edges, which can be severed in a subsequent process step. A constant thickness in this context means that a maximum deviation in thickness in the central region is less than 5% with respect to the thickness desired in the central region, preferably less than 2%, and most preferably less than 1%.

The ceramizable green glass components so obtained have a significantly improved surface quality as compared to the preform, preferably a fire-polished quality, at least in the central region. Fire-polished surface herein refers to a quality of a surface exhibiting a roughness of not more than $R_a$=20 nm.

While the preform may exhibit an average roughness $R_a$ in a range of not less than $R_a$=8 nm, the method of the invention permits to produce ceramizable thin glass sheets with an $R_a$ of 4 nm. Roughness depth $R_d$ preferably is at most $R_d$=6 nm, more preferably at most $R_d$=4 nm, and most preferably not more than $R_d$=2 nm. The roughness depth is determined in accordance with DIN EN ISO 4287 using a white light profilometer.

By subsequent ceramization during which the ceramizable green glass component, after having been cooled to less than 300° C., preferably to room temperature, is reheated and ceramized, glass ceramic articles having a thickness d of less than 500 μm, 100 μm, 50 μm, 40 μm, 30 μm, 20 μm, or 10 μm and with at least one fire-polished surface can be produced in this way at low costs and in large quantities. A thickness-to-width ratio from 1:2 to 1:20,000 of the glass ceramic article can be achieved.

Ceramization of the green glass component may be performed in a process step separately from the redrawing process, preferably in a ceramization furnace, where the green glass component, after having been cooled to less than 300° C., preferably to room temperature, is reheated and ceramized.

A glass ceramic article produced in this way may have a crystalline content of at least 20 vol %, preferably at least 50 vol %, and more preferably at least 90 vol %.

EXAMPLE 2

BaTiO$_3$ Glass Ceramic

A ceramizable green glass body, preferably of BaTiO$_3$, is provided as a preform for producing a thin glass ceramic that has specific dielectric properties.

To obtain the preform, the green glass may be cast into a bar shape with dimensions of, e.g., B=120 mm and D=14 mm. From these bars, sheet-like preforms are produced with a width of B=120 mm and a length of L>1000 mm and a thickness of D=2 mm. This preform is then introduced into the redrawing apparatus and is heated, in a preheating zone, to a temperature that that is equivalent to the glass transformation point (about $10^{13}$ dPa·s) and is below the crystallization and nucleation temperature.

While the preform is lowered into a deformation region at a velocity of 1 mm/s, with a height of the deformation zone between 5 and 10 mm, the glass is brought to at least a temperature which is equivalent to a viscosity of less than $10^{7.6}$ dPa·s and, at a maximum, to a viscosity of about $10^4$ dPa·s, using a CO$_2$ laser at a power of 3000 W and a scanning optical system.

The ceramizable green glass component obtained is withdrawn faster than the preform is advanced. In this way, a ceramizable green glass ribbon is resulting which has a width of b=80 mm, for example, with a thickness in a central region of d=0.02 mm. The so obtained green glass ribbon is substantially free of crystals. It can be ceramized into a glass ceramic article and has the desired dielectric properties.

EXAMPLE 3

Drawing of Optical Glass (Fluorophosphate Glass)

Here, the glass is cast into bar shape with dimensions of B=120 mm and D=14 mm, for example. This bar is then introduced into the redrawing apparatus and is heated, in a preheating zone, to a temperature that is equivalent to the glass transformation point (about $10^{13}$ dPa·s). Then the preform is lowered into a deformation region having a height of 40 mm, where the preform is heated to at least a temperature which is equivalent to a viscosity of less than $10^{7.6}$ dPa·s and, at a maximum, to a viscosity of about $10^4$ dPa·s. The emerging glass is passed through a cooling zone and is clamped in drawing means and is withdrawn faster than the preform is advanced. As a result, a glass ribbon is obtained that has a width of 100 mm and a thickness in a central region of 0.3 mm.

EXAMPLE 4

Drawing of Flat Glass (Borofloat®)

A flat glass having a width of 300 mm and a thickness of 10 mm is provided as a preform. This preform is advanced into the deformation region after having passed through a preheating zone (about $T_g$). In this region, the preform is brought to at least a temperature that is equivalent to a viscosity between $10^4$ dPa·s and less than $10^{7.6}$ dPa·s, over its entire width and a height of 20 mm thereof. The emerging glass is clamped in drawing means after having passed through a cooling zone. By suitably choosing the velocity of the preform and that of the product, a central thickness of not more than 100 µm is adjusted and the product is wound onto a drum. In this way, a product with a width of at least 250 mm is obtained.

COMPARATIVE EXAMPLE 5

Conventional Redrawing of Ceramizable Green Glass in a Redrawing System for Drawing Flat Glass A preform of green glass (Robax composition) or flat glass (Borofloat®) with a width of B=50 mm and a thickness of D=21.1 mm is provided. This preform is advanced into the deformation region after having passed through a preheating zone. In the deformation region, the glass is brought to a temperature equivalent to a viscosity of about $10^7$ dPa·s, over the entire width thereof and over a height of 300 mm.

The glass cannot be drawn, since nucleation processes and crystallization already start in the deformation region. As a result, the preform will break.

The glass ceramic article produced according to the invention can be used in various applications, for example as a dielectric component in capacitors, antennas, as an interposer in electronic components, as a separator in batteries, or as an electronic substrate.

Flat ceramizable green glass components of excellent surface quality can be produced particularly easily in large numbers and at low costs.

Further details of the invention will be apparent from the description of the illustrated exemplary embodiments and the appended claims.

DETAILED DESCRIPTION

Figure 1:
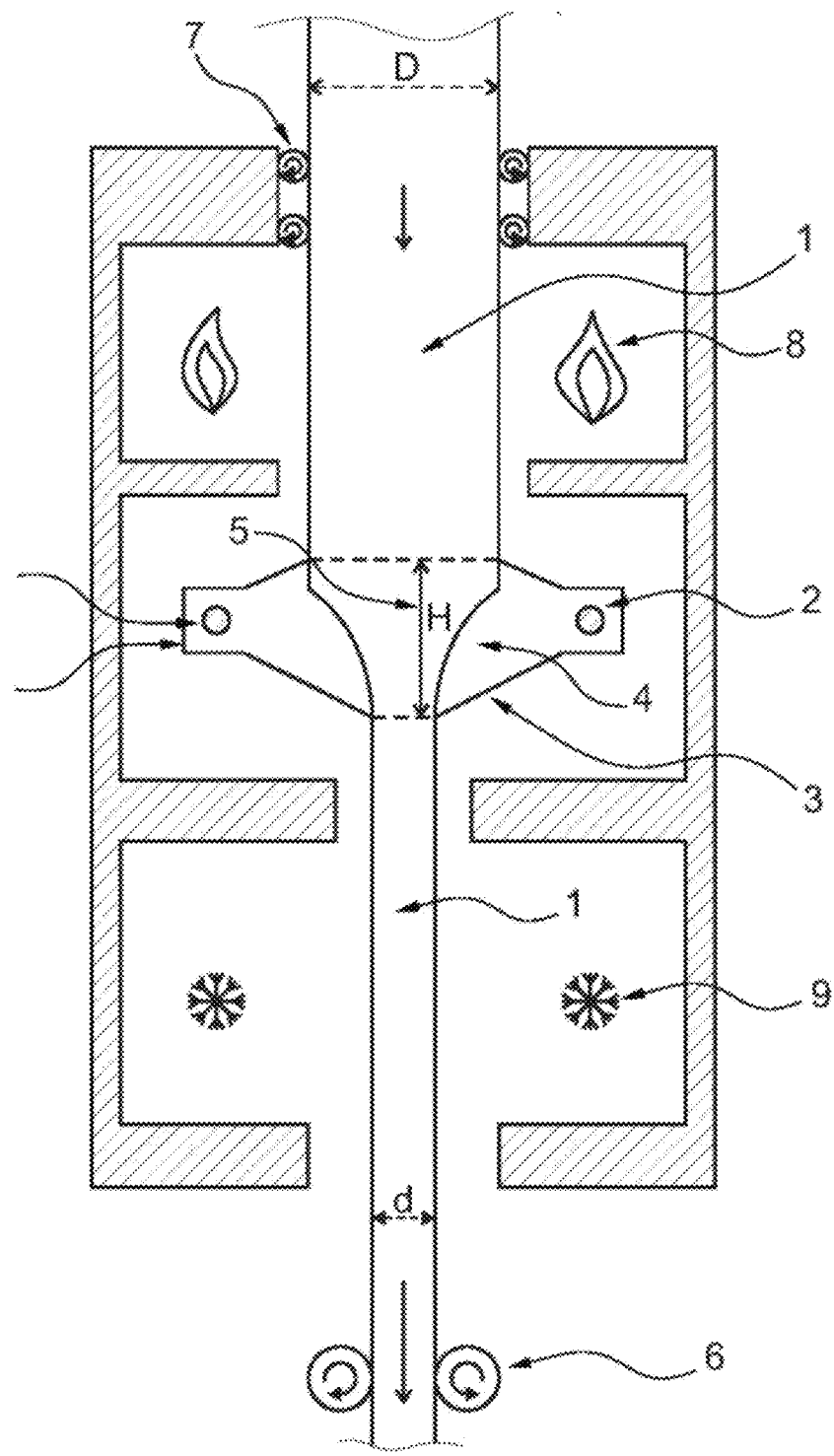
FIG. 1 is a schematic side view of the configuration of an exemplary embodiment of a redrawing apparatus according to the invention.

In the following detailed description of preferred embodiments, the same reference numerals designate substantially similar parts in or on these embodiments, for the sake of clarity.

FIG. 1 is a schematic side view of the configuration of an exemplary embodiment of a redrawing apparatus according to the invention. In the redrawing apparatus, a preform 1 is advanced through the device from above downwards. The redrawing apparatus comprises two heating means 2 which are arranged in a central region of the device. In this embodiment, the heating means are shielded by shields 3 so that a deformation region 4 is defined. A portion of the preform 1, which is located in the deformation region 4 is heated so that it reaches temperature T2. This portion is the deformation zone 5 having a height H. The preform 1 is drawn downwards by drawing means 6, here implemented in the form of two driven rollers. Since the feeding means 7, here likewise implemented in the form of rollers, feed the preform 1 slower than the drawing means 6 draw, the preform 1 is deformed in deformation region 4. Thereby, preform 1 becomes thinner, that means the thickness d after deformation is smaller than the thickness D before deformation.

Before the preform 1 is fed into the deformation region 4, it is preheated to a temperature T1 using preheating means 8, here symbolized by a burner flame. After having passed through the deformation region 4, the preform 1 is exposed to cooling means 9, here symbolized by an ice crystal.

Figure 2:
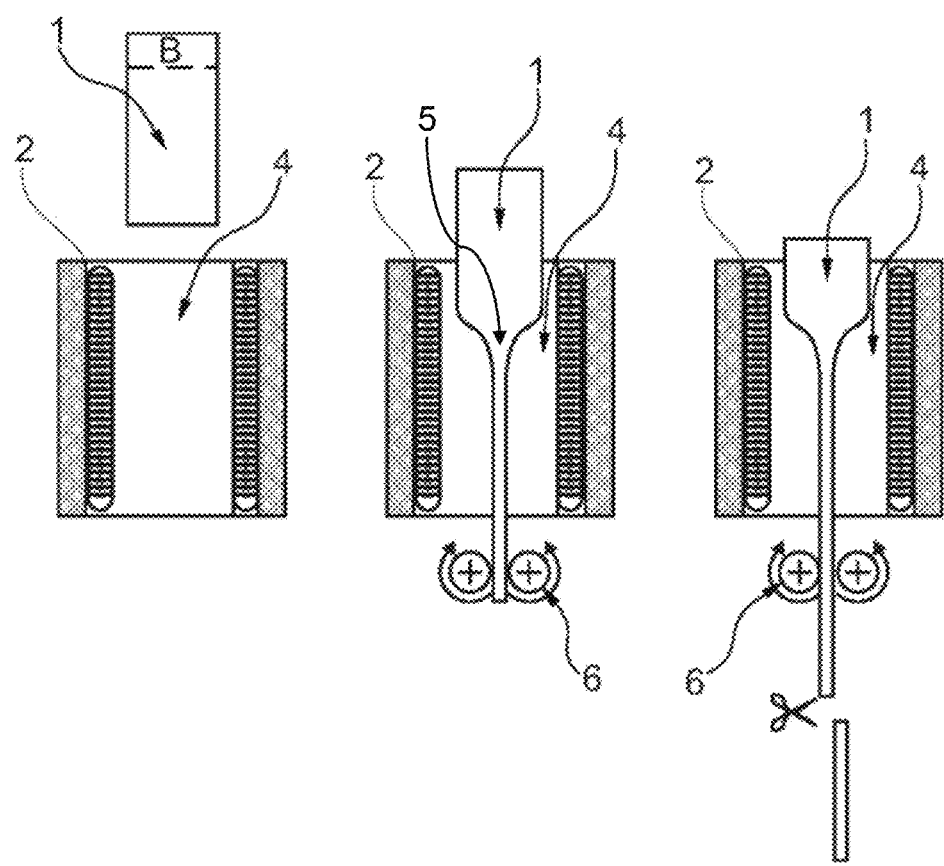
FIG. 2 schematically shows the procedure of a method according to the prior art.

FIG. 2 schematically shows the procedure of a method according to the prior art. This view differs from that of FIG. 1 in that it illustrates the change in width B of the preform. Preform 1 is advanced into a deformation region 4. Deformation region 4 is heated by heating means 2, here a resistance heater. Preform 1 is heated so that a deformation zone 5 develops in the glass, in which the glass has a low viscosity. However, since limits are lacking and because of the height of the heating means 2, the deformation zone 4 is substantially larger than that of the present invention. Therefore, the reduction in width of the preform 1 is particularly pronounced. Furthermore, drawing means 6 are shown, which extend the preform 1 longitudinally.

Figure 3:
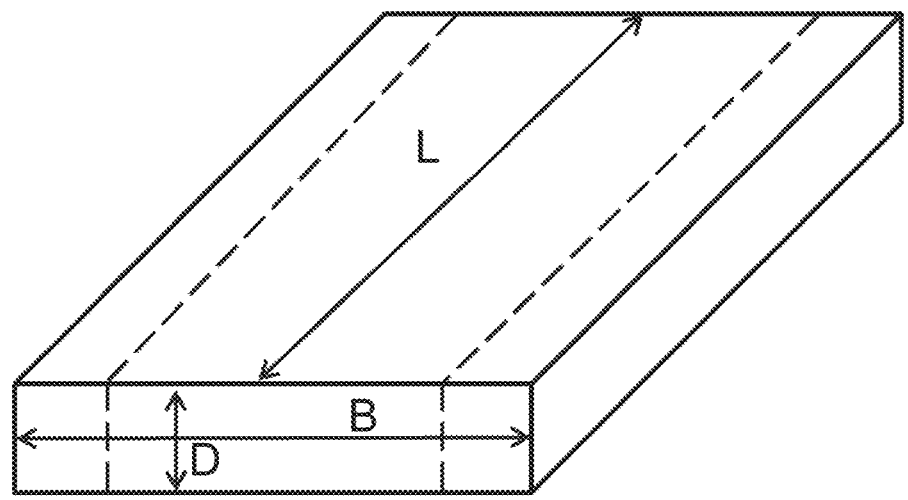
FIG. 3 schematically shows a preform.

FIG. 3 schematically shows a preform having a length L, a thickness D, and a width B.

Figure 4:
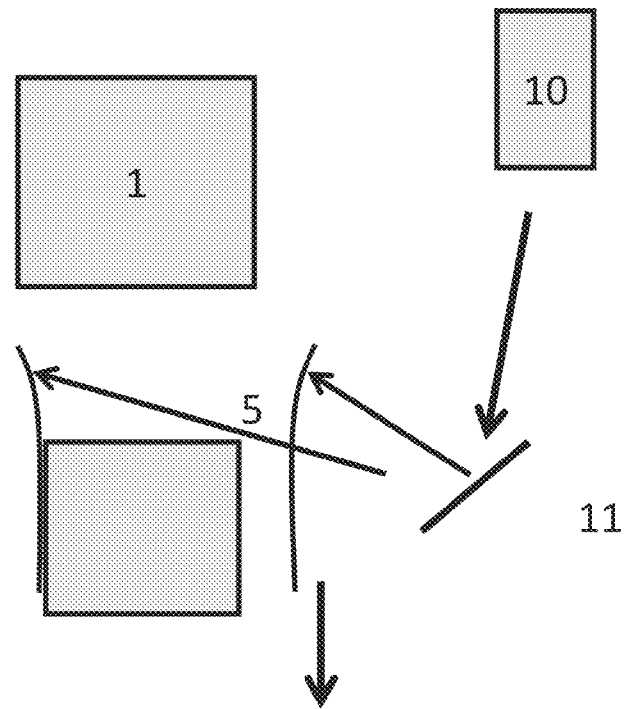
FIG. 4 schematically illustrates a configuration comprising a laser.

FIG. 4 schematically shows the configuration of a heating means comprising a laser 10. The laser beam is directed onto the ceramizable green glass using a scanner mirror 11. By moving the scanner mirror, the deformation zone is uniformly heated. An optional optical beam forming system is not shown.

Figure 5:
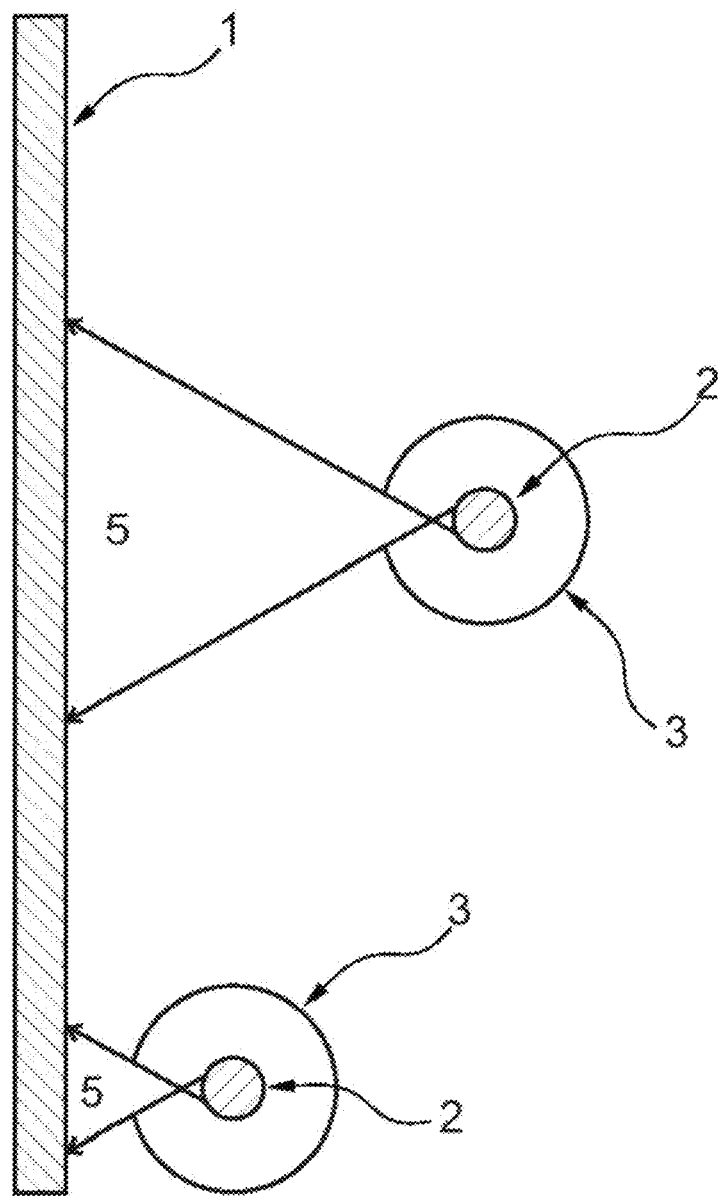
FIG. 5 schematically shows the operation of an optional radiation heater as a heating means.

FIG. 5 schematically illustrates the operation of a possible radiation heater which may be employed as a heating means 2. Depending on its distance from preform 1, the height of deformation zone 5 will be different. The figure moreover shows how the deformation zone 5 can be limited by being shaded using a shield 3, in order to obtain a deformation zone 5 of rather small height.

Thus, both the distance and the configuration of the heater may serve to adjust the height of deformation zone 5.

Figure 6:
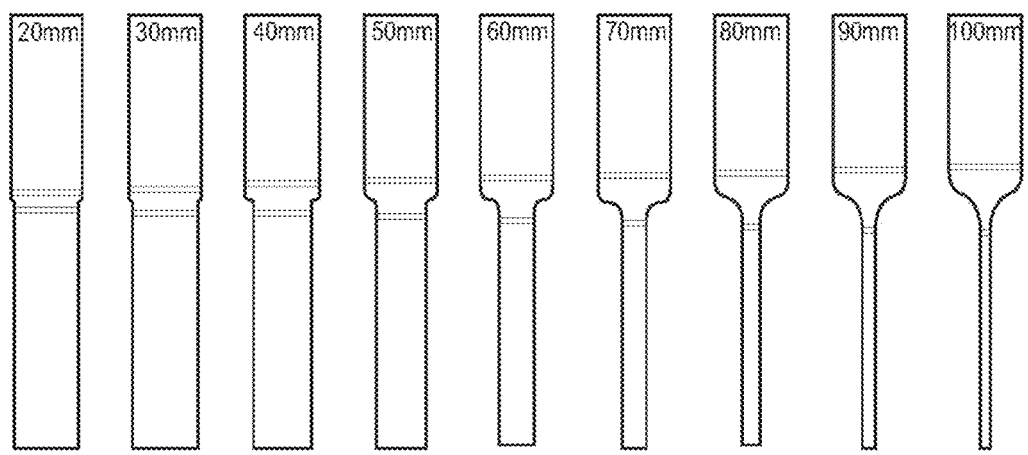
FIG. 6 illustrates the influence of the height of the deformation zone during redrawing.

FIG. 6 shows how the width of a glass product depends on the height of the deformation zone during redrawing. It can be seen that a deformation zone of smaller height has the effect to reduce the reduction in width of the preform.

Figure 7:
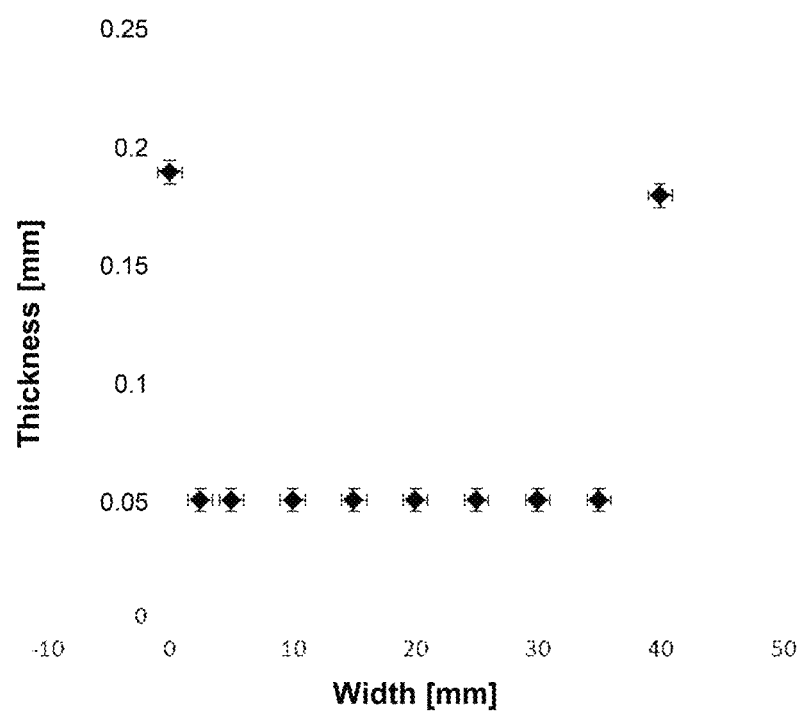
FIG. 7 shows a possible thickness distribution.

FIG. 7 shows the profile of thickness d of a flat glass product according to example 3 over the width b of the product. As is apparent therefrom, the borders at the edges of the glass product are rather narrow. The portion having a homogeneous low thickness can be used for the application of the glass product, the borders have to be severed. With the inventive method, yield is particularly high.

Figure 8:
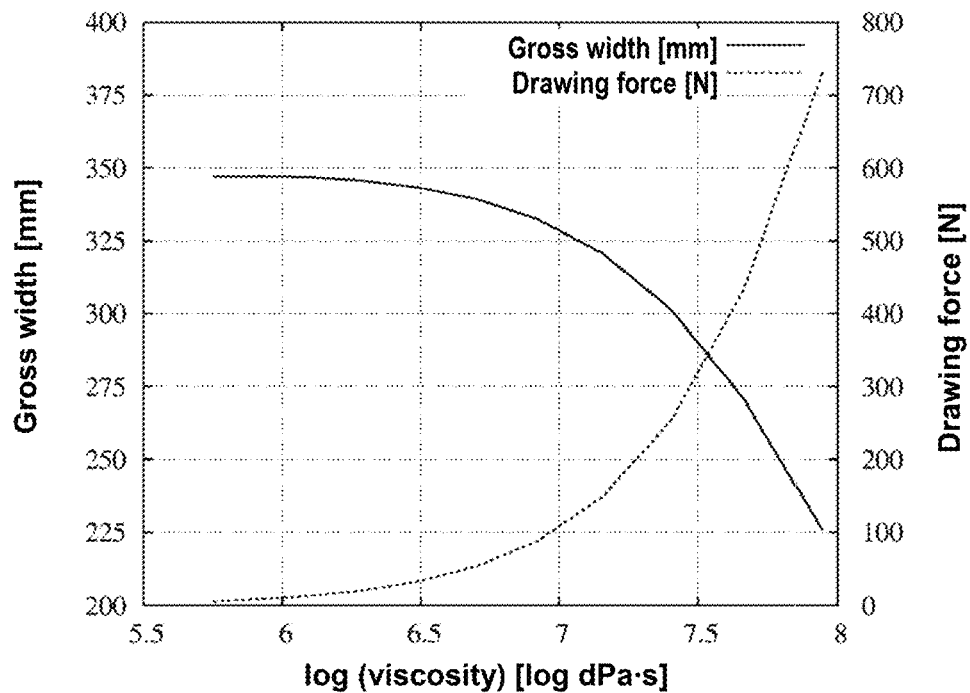
FIG. 8 shows an example of the average width b (gross width) of a redrawn green glass component and the required drawing force, as a function of the viscosity of the glass of the preform in each case.

FIG. 8 shows an example of the average width b (gross width) of the extended green glass component and the drawing force required for extending, as a function of the viscosity of the glass of the preform, for the case of a preform having a thickness of 4 mm and a width of 400 mm, which is introduced at 5 mm/min into a muffle having a height of 40 mm. The glass is withdrawn at 200 mm/min. It is clearly apparent that the required drawing force progressively increases with increasing viscosity. Furthermore, it can be seen that the average width b of the obtained product progressively decreases with increasing viscosity.

Figure 9:
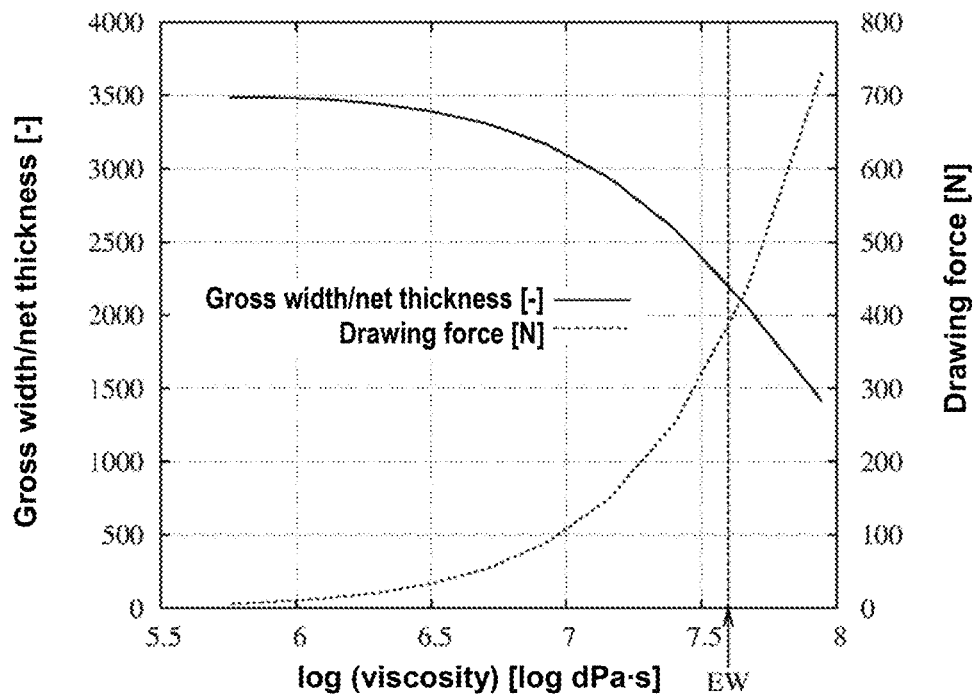
FIG. 9 shows an example of the ratio of the average width b (gross width) to the average thickness d (net thickness) of the redrawn glass component and the required drawing force, as a function of the viscosity of the glass of the preform in the deformation zone in each case.

FIG. 9 shows an example of the ratio of the average width b (gross width) to the average thickness d (net thickness) of the extended glass component and the drawing force required for extending, as a function of the viscosity of the glass of the preform in the deformation zone, for the case of a preform having a thickness of 4 mm and a width of 400 mm, which is introduced at 5 mm/min into a muffle having a height of 40 mm. The glass is withdrawn at 200 mm/min. It is apparent that the width-to-thickness ratio b/d of the obtained product progressively decreases with increasing viscosity. When compared to the decrease in average width b with increasing viscosity as shown in FIG. 7, the ratio b/d decreases even more strongly with increasing viscosity.

The table below shows, by way of example, a redrawing method which may be carried out as described in U.S. Pat. No. 3,635,687, for example, with a first example 1 without edge cooling and a second example 2 with edge cooling.

These prior art examples are compared to a third example 3, the inventive method, which uses a very small deformation region. The length of the deformation region in this case is less than one tenth of the length of the deformation region in a prior art method according to any one of the first two examples.

TABLE 1

Exemplary embodiment and comparative examples

|  | Example 1: U.S. Pat. No. 3,635,687 without edge cooling | Example 2: U.S. Pat. No. 3,635,687 with edge cooling | Example 3: Invention |
| --- | --- | --- | --- |
| Length of deformation region [mm] | 508 | 508 | 30 |
| Width B [mm] of preform | 508.0 | 508.0 | 120.0 |
| Thickness D [mm] of preform | 6.4 | 6.4 | 14.0 |

TABLE 1-continued

Exemplary embodiment and comparative examples

|  | Example 1: U.S. Pat. No. 3,635,687 without edge cooling | Example 2: U.S. Pat. No. 3,635,687 with edge cooling | Example 3: Invention |
| --- | --- | --- | --- |
| Ratio B/D | 80.0 | 80.0 | 8.6 |
| Width b [mm] of component | 19.1 | 61.4 | 100.0 |
| Central thickness d [mm] of component | 0.1 | 0.1 | 0.3 |
| Ratio b/d | 250.0 | 853.3 | 333.3 |
| (Ratio b/d)/(Ratio B/D) | 3.1 | 10.7 | 38.9 |

The inventive method permits to produce ceramizable green glass components, which are characterized by: a thickness d of less than 2000 µm, less than 1000 µm, less than 500 µm, less than 100 µm, preferably less than 50 µm, more preferably less than 40 µm, less than 30 µm, less than 20 µm, less than 10 µm; and/or a thickness-to-width ratio d/b of the green glass component of not more than 1:200, preferably not more than 1:20,000, and most preferably not more than 1:200,000; and/or at least one surface having fire-polished surface quality with $R_a$ 20 nm, at least in sections thereof.

A ceramizable green glass component produced in this manner is furthermore characterized by the fact that the ceramizable green glass component has a crystalline content of less than 20 vol %, preferably less than 10 vol %, and more preferably less than 5 vol % and can consequently be ceramized in a conventional ceramization process.

The ceramizable green glass component may be plate-shaped so as to have two opposite faces and a peripheral edge.

At least one of the faces may have a fire-polished surface quality with $R_a$ 20 nm, at least in sections thereof.

The ceramizable green glass component may further have a thickness-to-width ratio d/b of not more than 1:200 to 1:20,000, preferably of at most 1:20,000, more preferably of at most 1:200.000.

The ceramizable green glass component may be subjected to a ceramization process, with or without intermediate processing, in order to produce a glass ceramic article. In this case, after having been cooled to less than 300° C., preferably to room temperature, the ceramizable green glass component can be reheated and ceramized.

After ceramization, the glass ceramic article may have a crystalline content of at least 20 vol %, preferably at least 50 vol %, and more preferably at least 90 vol %.

A glass ceramic article produced in this manner can be used as a dielectric component in capacitors, as an antenna, as an interposer in electronic components, as a separator in batteries, as a substrate for thin-film batteries, as a flexible substrate for displays, as a mask or filter for display applications, as a substrate for high-temperature deposition processes, for example crystal growth, as a cover or protection for optical or electronic components, or as an electronic substrate.

LIST OF REFERENCE NUMERALS

1 Preform
2 Heating means
3 Shield

4 Deformation region
5 Deformation zone
6 Drawing means
7 Feeding means
8 Preheating means
9 Cooling means
10 Laser
11 Scanner mirror

What is claimed is:

1. A method for producing a glass ceramic article, comprising the steps of:
    preparing a glass melt of ceramizable glass;
    producing, from the glass melt, a ceramizable green glass body as a preform;
    providing the preform to a redrawing apparatus;
    heating at least a portion of the preform;
    redrawing the preform into a ceramizable green glass component, wherein the ceramizable green glass component has a crystalline content of less than 20 vol%.

2. The method as claimed in claim 1, wherein the crystalline content is less than 10 vol%.

3. The method as claimed in claim 1, wherein the ceramizable green glass component has a crystalline content of less than 2.5 vol%.

4. The method as claimed in claim 1, wherein the preform has a thickness D, a width B, and a length L, and wherein the green glass component has a thickness d, a width b, and a length l, and wherein a width-to-thickness ratio changes due to the redrawing.

5. The method as claimed in claim 4, wherein the redrawing develops a deformation zone that has a height H of not more than 50*D, the deformation zone being a portion of the preform having a thickness between 0.95*D and 1.05*d.

6. The method as claimed in claim 5, wherein the height H is not more than 6*D.

7. The method as claimed in claim 5, wherein the step of heating further comprises:
    heating the preform to a first temperature below a crystallization temperature and below a softening point of the green glass; and
    heating the preform to a second temperature above the softening point in the deformation zone.

8. The method as claimed in claim 1, wherein the ceramizable glass is selected from the group consisting of barium titanate glass, lithium aluminum silicate glass, lithium silicate glass, magnesium aluminosilicate glass, zinc aluminosilicate glass, magnesium silicate glass, sodium aluminosilicate glass, potassium aluminosilicate glass, phosphate glass, and calcium aluminosilicate glass.

9. The method as claimed in claim 1, wherein the ceramizable glass comprises a composition, in mol%:
    $SiO_2$ 5-20;
    $Al_2O_3$ 4-15;
    $B_2O_3$ 0-5;
    BaO 20-45;
    $TiO_2$ 20-60;
    CaO 0-5;
    SrO 0-10;
    $CeO_2$ 0-5;
    $ZrO_2$ 0-10;
    $La_2O_3$ 0-40;
    $MnO_2$ 0-5;
    $Y_2O_3$ 0-5; and
    $Nb_2O_3$ 0-30.

10. The method as claimed in claim 1, wherein the ceramizable glass comprises a composition, in mol%:
    $Al_2O_3$ 3-12;
    BaO 30-45;
    $B_2O_3$ 0-5;
    $La_2O_3$ 0-5;
    $CeO_2$ 0-5;
    $SiO_2$ 5-25;
    $TiO_2$ 25-42;
    CaO 0-5;
    $\Sigma Al_2O_3+B_2O_3+SiO_2+P_2O_5$ 15-30;
    $\Sigma TiO_2+ZrO_2+Nb_2O_3+V_2O_5+HfO_2+Sc_2O_3$ 20-50; and
    $\Sigma BaO+CaO+SrO+CeO_2+RE_2O_3$ 30-50.

11. The method as claimed in claim 1, wherein the ceramizable glass comprises a composition, in mol%:
    $Al_2O_3$ 5-15;
    BaO 20-30;
    $La_2O_3$ 0-10;
    $CeO_2$ 0-2;
    $SiO_2$ 5-20;
    $TiO_2$ 40-60;
    $ZrO_2$ 5-10;
    $\Sigma Al_2O_3+B_2O_3+SiO_2+P_2O_5$ 15-30;
    $\Sigma TiO_2+ZrO_2+Nb_2O_3+V_2O_5+HfO_2+Sc_2O_3$ 30-55; and
    $\Sigma BaO+CaO+SrO+CeO_2+RE_2O_3$ 25-40,
    wherein RE is one or more rare earth elements having atomic numbers selected from the group consisting of 39 and from 57 to 71.

12. The method as claimed in claim 1, wherein the ceramizable glass comprises the following components, in % of cations:

| | |
|---|---|
| $Si^{4+}$ | 45 to 65; |
| Crystal agonists | |
| $Li^+$ | 25 to 40; |
| $K^+$ | 0 to 8; |
| $Na^+$ | 0 to 8; |
| Crystal antagonists | |
| $B^{3+}$ | 0 to 5; |
| $Al^{3+}$ | 0 to 10; |
| $Zn^{2+}$ | 0 to 4; |
| Nucleating agents | |
| $Ce^{3+}/Ce^{4+}$ | >0 to 0.3; and |
| $Ag^+$ | >0 to 0.5. |

13. The method as claimed in claim 1, wherein the ceramizable green glass component comprises a thickness d of less than 2000 μm.

14. The method as claimed in claim 1, wherein the ceramizable green glass component comprises a thickness d of less than less than 10 μm.

15. The method as claimed in claim 1, wherein the ceramizable green glass component comprises a thickness-to-width ratio d/b of not more than 1:200.

16. The method as claimed in claim 1, wherein the ceramizable green glass component comprises a thickness-to-width ratio d/b of not more than 1:200,000.

17. The method as claimed in claim 1, wherein the ceramizable green glass component comprises a surface having at least one section with a fire-polished surface quality of $R_a \leq 20$ nm.

18. The method of claim 17, further comprising configuring the ceramizable green glass component to a shape with two faces and a peripheral edge, and wherein the surface having the at least one section with the fire-polished surface is at least one of the two faces.

19. The method of claim 1, further comprising subjecting the ceramizable green glass component to a ceramization process, with or without intermediate processing, after having been cooled to less than 300 ° C., wherein during the ceramization process the ceramizable green glass component is reheated and ceramized to produce the glass ceramic article.

20. The method of claim 19, wherein the ceramization process provides the glass ceramic article with a crystalline content of at least 20 vol%.

21. The method of claim 19, wherein the ceramization process provides the glass ceramic article with a crystalline content of at least 90 vol%.

22. The method of claim 19, further comprising configuring the glass ceramic article for a use selected from the group consisting of a dielectric component in a capacitor, an antenna, an interposer in an electronic component, a separator in a battery, a substrate for a thin film battery, a flexible substrate for a display, a mask or filter for a display, a substrate for a high-temperature deposition processes, a cover or protection for an optical component, a cover or protection for an electronic component, and an electronic substrate.

* * * * *